United States Patent [19]

Nelle

[11] 4,400,651

[45] Aug. 23, 1983

[54] METHOD AND CIRCUIT FOR OPERATING AN INCANDESCENT LAMP

[75] Inventor: Gunther Nelle, Bergen, Fed. Rep. of Germany

[73] Assignee: Dr. Johannes Heidenhain GmbH, Traunreut, Fed. Rep. of Germany

[21] Appl. No.: 307,314

[22] Filed: Sep. 30, 1981

Related U.S. Application Data

[63] Continuation of Ser. No. 6,886, Jan. 26, 1979, abandoned.

[30] Foreign Application Priority Data

Feb. 4, 1978 [DE] Fed. Rep. of Germany ....... 2804839

[51] Int. Cl.³ .......................................... H05B 39/09
[52] U.S. Cl. .................................. 315/205; 315/105; 315/208; 315/209 R; 315/246
[58] Field of Search ............. 315/94, 101, 105, 200 R, 315/200 A, 205, 208, 209 R, 224, 246, 291, 311, 287, 362; 356/395–398; 363/132; 250/237 R; 331/108 A, 110, 138; 370/255

[56] References Cited

U.S. PATENT DOCUMENTS

| | | | |
|---|---|---|---|
| 2,838,675 | 6/1958 | Wanlass | 307/255 X |
| 3,078,379 | 2/1963 | Plogstedt et al. | 315/200 A X |
| 3,175,100 | 3/1965 | LaMothe | 307/255 |
| 3,376,491 | 4/1968 | Mas | 315/241 R X |
| 3,461,405 | 8/1969 | Bishop et al. | 363/132 X |

FOREIGN PATENT DOCUMENTS

| | | |
|---|---|---|
| 1489383 | 2/1969 | Fed. Rep. of Germany . |
| 1539453 | 10/1970 | Fed. Rep. of Germany . |
| 1589120 | 2/1975 | Fed. Rep. of Germany . |
| 1589223 | 7/1976 | Fed. Rep. of Germany . |
| 2423153 | 2/1975 | Fed. Rep. of Germany . |
| 581373 | 10/1946 | United Kingdom ................ 315/170 |

*Primary Examiner*—Eugene R. La Roche
*Attorney, Agent, or Firm*—Hume, Clement, Brinks, Willian & Olds

[57] ABSTRACT

A method and circuit for operating an incandescent lamp are disclosed in which the operating voltage applied to the lamp alternates in a regular and abrupt manner between forward and reverse polarities. The magnitude of the voltage is substantially the same for the two polarities and, therefore, the luminosity of the lamp is substantially constant. However, lamp life is increased as compared to standard DC operation since the alternating polarity of the operating voltage reduces the rate at which the lamp fails due to lamp filament breakage.

14 Claims, 2 Drawing Figures

METHOD AND CIRCUIT FOR OPERATING AN INCANDESCENT LAMP

This application is a continuation of application Ser. No. 6/006,886, filed Jan. 26, 1979, abandoned.

BACKGROUND OF THE INVENTION

The present invention concerns a method for operating an incandescent lamp with a DC voltage and, in particular, a method of operating an incandescent lamp as a source of illumination in an electro-optical measurement device.

Incandescent lamps are commonly operated either with a DC voltage or with a sinusoidally alternating current; however, investigations have shown that when operating temperatures of the lamp filament are below 2,700° K., as is nearly always the case in miniature lamps, for example, lamps operated with DC voltage fail at a substantially higher rate than do lamps operated with alternating current. Scanning electron microscope pictures of incandescent lamp filament have shown that when an alternating current is used to operate a lamp the lamp filament have little or no tendency to form bevels on the outside while when a DC voltage is used a noted beveling takes place on both the outside and inside surfaces of the lamp filament. Generally, the bevels on the inside and the outside of the filament are not parallel to each other, and the resulting constrictions often develop into deep notches which weaken the filament and lead to its premature breakage. Because of this beveling phenomenon, miniature lamps are preferably operated with a sinusoidally alternating current in most applications.

In many electro-optical measurement devices, however, lamps should not be operated with a sinusoidally alternating current, for such operation results in modulations of the lamp luminosity and the measurement signal which cannot be detected by the eye but which result in measurement errors.

Furthermore, there are known methods for operating lamps in an impulse manner to increase lamp performance without influencing the life of the lamp, specifically to increase the life of the lamp at a given performance (West German DT-AS No. 1 589 223, West German DT-OS No. 1 539 453). In this mode of operation the lamp operating voltage may increase from zero to a predetermined value V and then, after a specific time, drop again to zero.

Furthermore, there are known procedures for regulating and stabilizing lamp output in which a lamp is operated with square wave impulses having an adjustable width (West German DT-OS No. 2 423 153, West German DT-OS No. 1 489 383, West German DT-PS No. 1 589 120).

SUMMARY OF THE INVENTION

The present invention is directed to a method and a circuit arrangement for operating an incandescent lamp, in particular a lamp for an electro-optical measurement device, in which the lamp exhibits both an effectively constant luminosity and an increased life. According to this invention, the lamp is operated with a DC voltage which abruptly and repeatedly alternates in polarity.

One important advantage of this invention is that an incandescent lamp having effectively constant luminosity is obtained through a simple means. This feature of the invention renders it particularly useful in electro-optical measurement devices where modulations of the measurement signal and associated measurement errors are to be avoided. At the same time, the method of this invention increases the life of the lamp as compared with standard DC voltage operation. This results in an increase in the time period between lamp replacement and a decrease in the down time for equipment in which the invention is employed.

A presently preferred embodiment of the invention employs a circuit in which an incandescent lamp is located on a diagonal branch of a bridge consisting of two complementary pairs of transistors which are subjected to a DC voltage. In this circuit, one electrode of the incandescent lamp is connected to the emitters of one pair of transistors and the other electrode is connected to the collectors of the other pair of transistors, and the bases of all four transistors are subjected to a square wave control signal. This circuit arrangement has the advantages of simplicity and low cost construction.

The invention, together with further objects and attendant advantages, will be best understood by reference to the following detailed description taken in connection with the accompanying drawings.

DETAILED DESCRIPTION OF A PREFERRED EMBODIMENT

Figure 1:
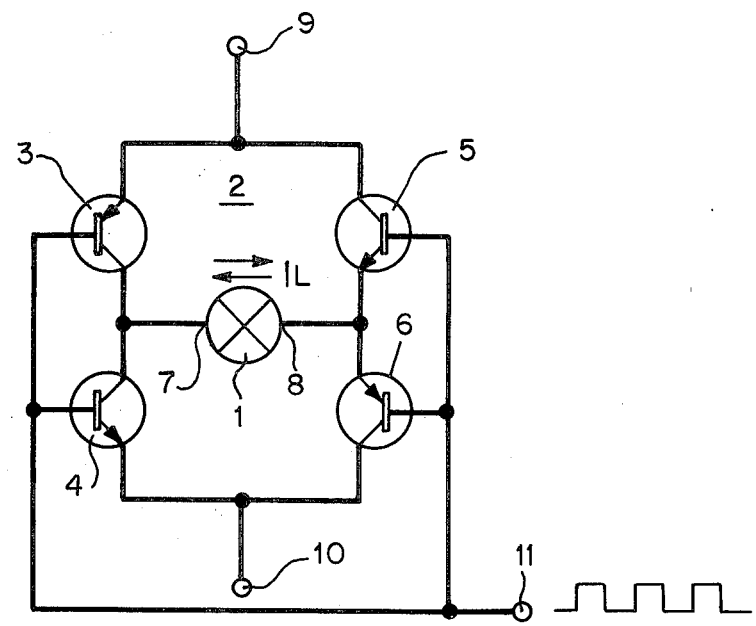
FIG. 1 is a schematic drawing of a preferred embodiment of an electrical circuit for operating an incandescent lamp according to the present invention.

Referring now to the drawings, FIG. 1 shows an incandescent lamp 1 included in the diagonal branch of a bridge circuit 2 which is subjected to DC voltage. The bridge circuit 2 includes two pairs of complementary transistors 3,4,5,6. A first electrode 7 of the incandescent lamp 1 is connected to the collectors of a first pair of complementary transistors 3,4 and a second lamp electrode 8 is connected to the emitters of the second pair of complementary transistors 5,6. A positive DC voltage is applied via terminal 9 to the emitter of transistor 3 and the collector of transistor 5, and the collector of transistor 6 and the emitter of the transistor 4 are connected to a negative DC voltage via terminal 10. Furthermore, the bases of all four transistors 3,4,5,6 are subjected to a square wave control signal which is provided at terminal 11 by a square wave generator (not shown). As used herein, the term "square wave signal" is used to denote a signal which abruptly alternates between two signal levels, and is meant to include signals which alternate on a regular or an irregular basis as well as signals which allow equal or unequal residence times at the two signal levels.

This preferred circuit arrangement causes a direct current $I_L$ to flow through the incandescent lamp 1. This current $I_L$ abruptly changes polarity at predetermined, preferably constant, time intervals. Preferably, the period of the square wave control signal is 50 or 100 hz. Current $I_L$ changes polarity so quickly that, as a result of the thermal inertia of the filament, the luminosity of the lamp remains substantially constant. Thus, modulations of the measurement signal of electro-optical measurement systems employing the circuit of FIG. 1 and associated measurement errors are reduced. At the same time, the periodic reversal of the polarity of $I_L$ provides a suppression of bevel formation in the filament of lamp 1. The life duration of the filament is substantially increased as compared with DC voltage operation, for filament constrictions and associated filament breakage are reduced.

Figure 2:
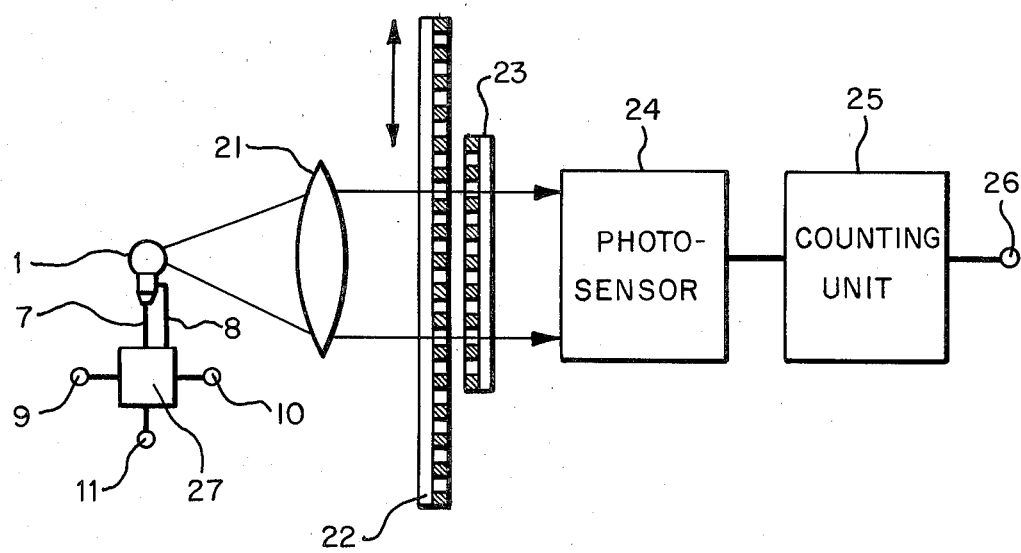
FIG. 2 is a schematic representation of an electro-optical measuring device incorporating the circuit of FIG. 1.

FIG. 2 schematically represents an electro-optical measurement system which employs the circuit of FIG. 1. The light of the incandescent lamp 1 is collimated by a condensor 21 and then passes through a gauge 22 and a scanning plate 23 onto a scanning photosensor 24. At the movement of the gauge 22 relative to the scanning plate 23, the scanning photosensor 24 produces periodic signals which are fed to an electronic counting unit 25 and through a connection 26 to a display unit (not represented) which indicates the position of the gauge 22 with respect to the plate 23. The circuit arrangement according to FIG. 1 is installed in the enclosure 27 and serves to operate the lamp 1 as described above.

Of course, it should be understood that various changes and modifications to the preferred embodiment described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A method for operating an incandescent, miniature coil lamp in an electro-optical device, the device including a scanning photosensor and a scale, wherein the lamp is arranged to illuminate the scale, the method comprising the step of:
    applying an operating voltage to the incandescent lamp, which voltage abruptly and repeatedly alternates between first and second polarities such that the magnitude of the voltage is maintained at a substantially constant value effective to increase the life of the lamp while generating effectively constant luminosity.

2. The method of claim 1 wherein the operating voltage alternates between said first and second polarities in a substantially regular manner such that the voltage is in the first polarity about 50 percent of the time and in the second polarity about 50 percent of the time.

3. In an electro-optical measuring device including a scanning photosensor, a scale and an incandescent filament lamp arranged to illuminate the scale, the improvement comprising:
    first means for applying an operating voltage with a first polarity to the lamp;
    second means for applying the operating voltage with a second polarity to the lamp, said second polarity reversed with respect to said first polarity; and
    means for repeatedly and alternately activating the first and second means such that the voltage applied to the lamp repeatedly and abruptly alternates between the first and second polarities and the magnitude of the voltage is thereby maintained at a substantially constant value selected such that the lamp is operated at a filament temperature below about 2700° K. and the lamp exhibits both an effectively constant luminosity and an increased life.

4. In an electro-optical measuring device including a scanning photosensor, a scale, and a miniature coil lamp arranged to illuminate the scale and having a coil filament, the improvement comprising:
    a first pair of complementary transistors, said first pair having a first node connecting the emitters of the two transistors of the first pair;
    a second pair of complementary transistors, said second pair having a second node connecting the collectors of the two transistors of the second pair;
    means for applying a constant polarity DC voltage across the first and second pairs of complementary transistors;
    means for selectively activating transistors in the first and second pairs to repeatedly and abruptly alternate the polarity of the voltage applied between the first and second nodes such that the magnitude of the voltage between the first and second nodes remains substantially constant while the polarity of the voltage alternates; and
    means for connecting an incandescent lamp between the first and second nodes;
    said DC voltage selected such that the coil filament is operated at a temperature no greater than about 2700° K. and the lamp exhibits both an effectively constant luminosity and an increased life.

5. The circuit of claim 4 wherein the selectively activating means include means for applying a square wave control signal to the bases of the transistors of the first and second pairs of complementary transistors.

6. The circuit of claim 5 wherein the square wave control signal is a periodic signal having a frequency of about 50 Hz.

7. The circuit of claim 5 wherein the square wave control signal is a periodic signal having a frequency of about 100 Hz.

8. The circuit of claim 5 wherein the square wave control signal is a periodic signal having a frequency of between about 50 Hz and about 100 Hz.

9. In an electro-optical measuring device including a scanning photosensor, a scale, and a miniature incandescent filament lamp arranged to illuminate the scale, the improvement comprising:
    means for driving the lamp with a constant amplitude voltage of abruptly alternating polarity, the amplitude of said voltage effective to operate the lamp at a filament temperature no greater than about 2700° K., such that the lamp exhibits both an effectively constant luminosity and an increased life.

10. The device of claim 9 wherein the driving means comprises:
    a bridge circuit including two pairs of complementary transistors arranged so that one electrode of the incandescent lamp is connected to the collectors of one pair of complementary transistors and the other electrode is connected to the emitters of the other pair of complementary transistors;
    a DC power source connected to the emitters of the one pair of complementary transistors and to the collectors of the other pair of complementary transistors; and
    a square wave signal source connected to the bases of the two pairs of transistors.

11. The device of claim 10 wherein the frequency of the square wave applied to the bases of the transistors is in the range of 50 to 100 Hz.

12. The device of claim 9 wherein the polarity of the voltage alternates at constant intervals of time.

13. A method for operating a miniature incandescent filament lamp in an electro-optical measuring device, the device including a scanning photosensor and a scale, wherein the lamp is arranged to illuminate the scale, the method comprising the step of:

applying a constant amplitude operating signal to the incandescent lamp, the polarity of the signal abruptly alternating over time and the amplitude of the signal selected to operate the lamp at a filament temperature no greater than about 2700° K. in order to increase the life of the lamp while generating effectively constant luminosity.

14. The method of claim 13 wherein the polarity of the signal alternates at constant intervals of time.

* * * * *